United States Patent [19]

Hamai et al.

[11] 4,398,526

[45] Aug. 16, 1983

[54] PLASMA IGNITION SYSTEM FOR INTERNAL COMBUSTION ENGINE

[75] Inventors: Kyugo Hamai, Yokosuka; Yasuhiko Nakagawa, Kamakura; Meroji Nakai, Yokosuka; Ryuzaburou Inoue, Yokohama, all of Japan

[73] Assignee: Nissan Motor Company, Limited, Yokohama, Japan

[21] Appl. No.: 288,748

[22] Filed: Jul. 31, 1981

[30] Foreign Application Priority Data

Jul. 31, 1980 [JP] Japan .................. 55-105704

[51] Int. Cl.³ .............................................. F02P 3/08
[52] U.S. Cl. ................ 123/606; 123/143 B; 123/620; 123/637; 123/640
[58] Field of Search ............ 123/143 B, 606, 620, 123/637, 638, 640, 596, 605

[56] References Cited

U.S. PATENT DOCUMENTS

| | | |
|---|---|---|
| 3,934,566 | 1/1976 | Ward .................... 123/275 |
| 4,122,816 | 10/1978 | Fitzgerald et al. ......... 123/143 B X |
| 4,136,301 | 1/1979 | Shimojo et al. ............. 123/640 X |
| 4,223,656 | 9/1980 | Hamley ...................... 123/620 X |
| 4,258,296 | 3/1981 | Gerry .......................... 123/606 X |
| 4,287,862 | 9/1981 | Noguchi et al. ............. 123/536 X |

FOREIGN PATENT DOCUMENTS 52206 4/1979 Japan ................. 123/143 B

OTHER PUBLICATIONS

SAE article 770355, "Design of a Plasma Jet Ignition System for Automotive Application", by Asik et al., Feb. 28-Mar. 4, 1977.

Primary Examiner—Tony M. Argenbright
Attorney, Agent, or Firm—Schwartz, Jeffery, Schwaab, Mack, Blumenthal & Koch

[57] ABSTRACT

A plasma ignition system for a multi-cylinder internal combustion engine each cylinder having a plasma ignition plug, including diesel engine. According to the present invention, in addition to the elements of the conventional plasma ignition system there is provided an oscillation device which generates and outputs a high-frequency oscillating voltage into each of the plasma ignition plugs to be ignited before the plasma ignition timing so that a multiple sparking occurs and therefore the resistance of the plasma ignition plug to be ignited is reduced to facilitate plasma ignition with relatively low plasma ignition energy without misfire even during a high engine load.

14 Claims, 18 Drawing Figures

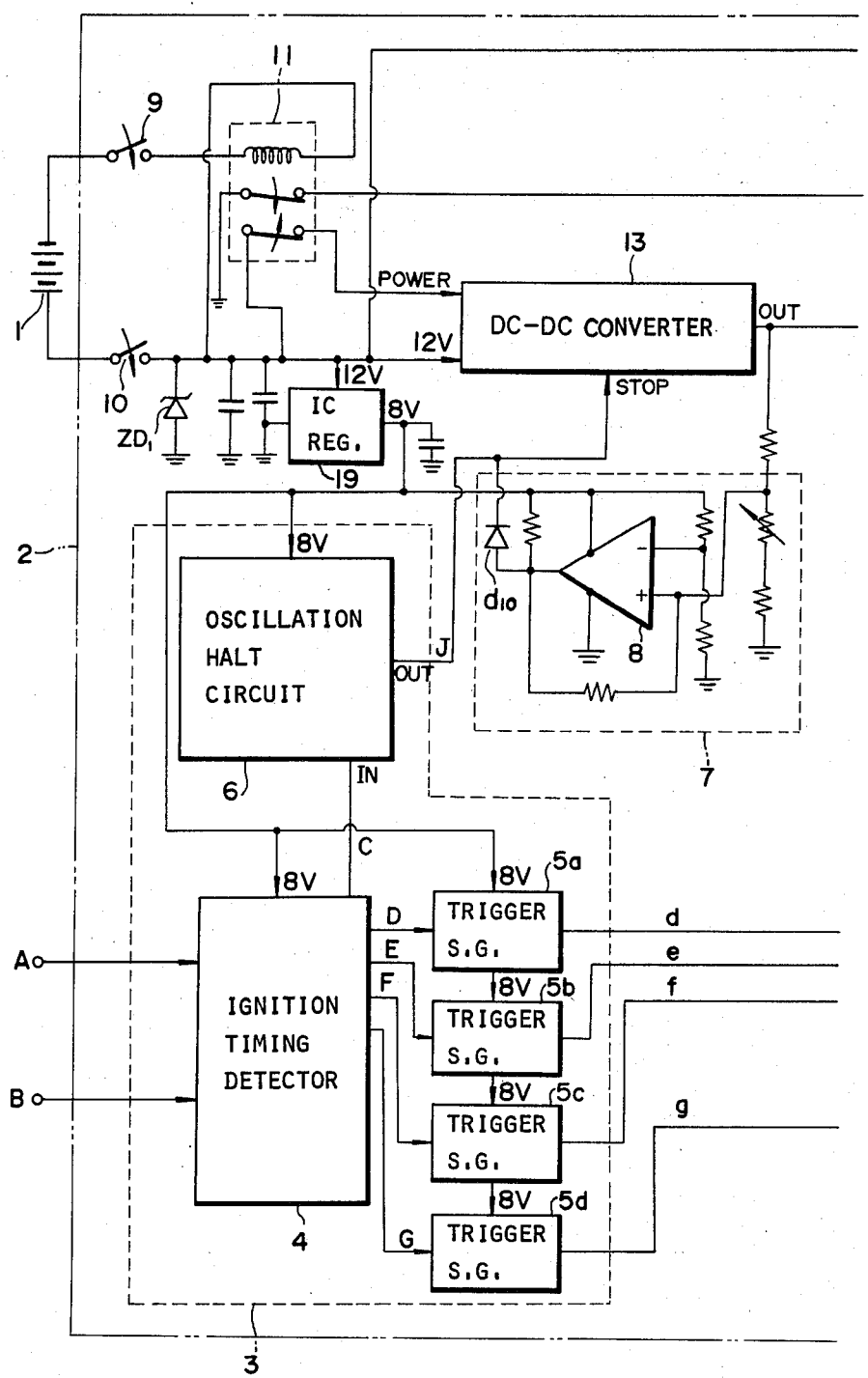
FIG. I(A) (PRIOR ART)

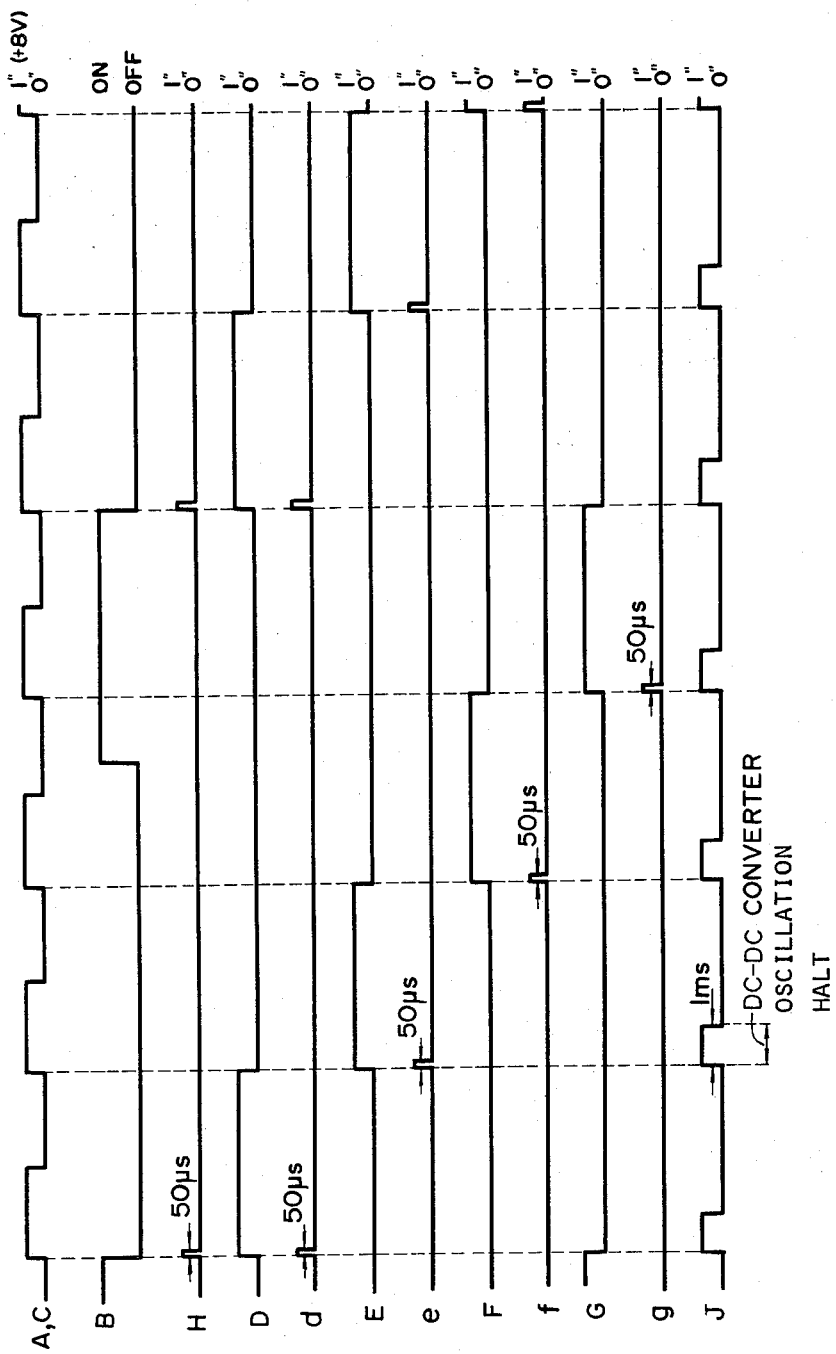

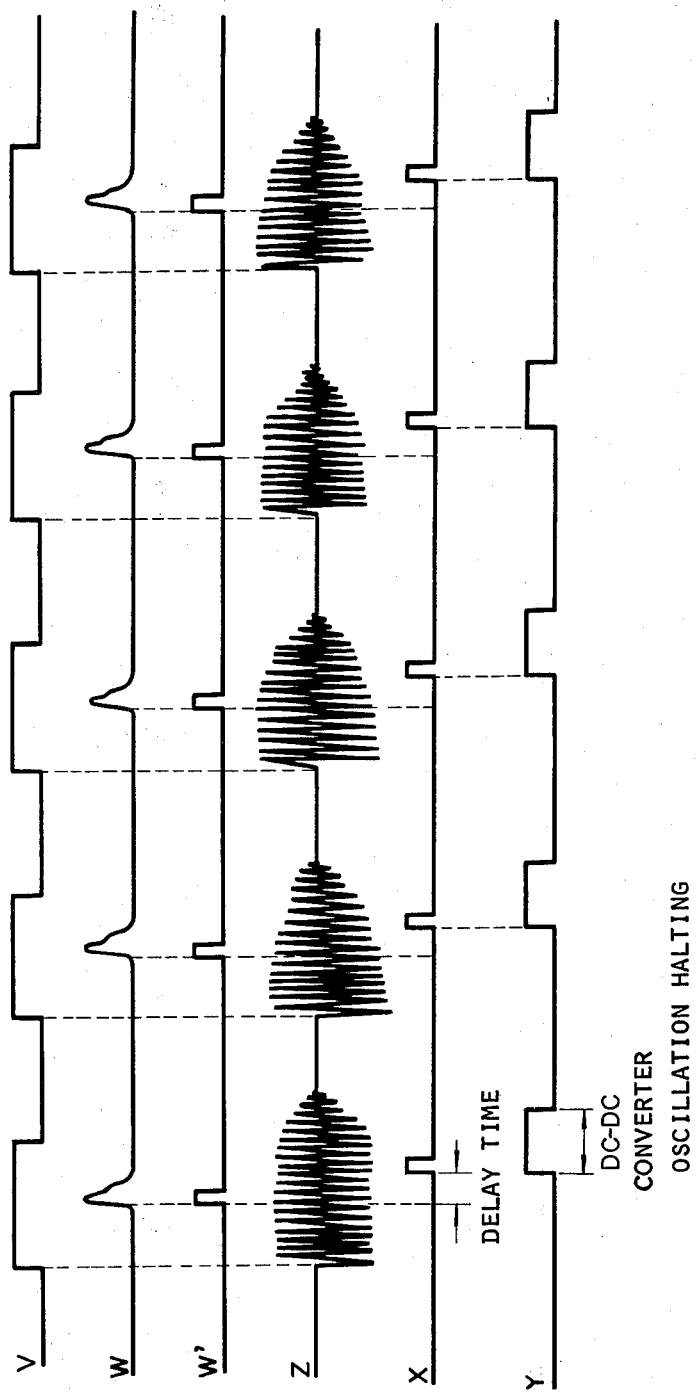

PLASMA IGNITION SYSTEM FOR INTERNAL COMBUSTION ENGINE

BACKGROUND OF THE INVENTION (1) Field of the Invention

The present invention relates to a plasma ignition system which can be applied to an internal combustion engine such as a diesel engine or high compression ratio gasoline engine.

(2) Description of the Prior Art

A conventional plasma ignition system for a four-cylinder diesel engine having a plasma ignition plug for each cylinder, comprises:

(a) a DC power supply such as a battery;

(b) a DC-DC converter for converting the DC voltage from the DC power supply to a high frequency AC voltage and rectifying the AC voltage to a high DC voltage;

(c) four capacitors, each connected between the DC-DC converter output via a diode and a corresponding plasma ignition plug via an inductor;

(d) four switching elements, each connected to the corresponding capacitor and to the DC-DC converter via the diode, for passing the plasma ignition energy from the corresponding capacitor to the corresponding plasma ignition plug when turned on;

(e) an ignition timing control circuit for outputting a trigger signal into sequentially-selected one of the four switching elements each time a plasma ignition timing signal according to the engine speed is inputted;

(f) a voltage comparator for comparing the output voltage of the DC-DC converter with a predetermined voltage and outputting an oscillation halt signal to an oscillation section (DC-AC inverting section) of the DC-DC converter to maintain the output voltage of the DC-DC converter constant; and (g) a group of four diodes, each diode connected between the corresponding capacitor and ground for grounding one of the electrodes of the capacitor so as to electrically disconnect the capacitor from the inductor while charging the corresponding capacitor with the ignition energy.

When both a power supply switch and an ignition switch both connected to the DC power supply are turned on, the DC-DC converter outputs a high DC voltage (several thousands volts) to the four capacitors via diodes, non-supply-side electrode of each of the four capacitors grounded by means of each of the four diodes. An ignition timing detector of the ignition timing control circuit comprising a 4-bit ring counter (or 4-bit shift register) which outputs a pulse signal sequentially to each of four output terminals in response to a series of pulse signals from, e.g., engine speed sensors (plasma ignition timing signal) whose repetition rate corresponds, for example, to half of the rotational speed of the engine in the four-cylinder engine during each one-engine cycle. When the pulse signal at one of the four output terminals of the ignition timing detector is fed into one of four trigger signal generators, each comprising, e.g., a monostable multivibrator, the trigger signal generator outputs a trigger signal to the corresponding switching element. Consequently, the switching element turns on so that the corresponding diode connected to the supply-side electrode of the capacitor is turned off and then the capacitor, inductor, and the corresponding ignition plug form an oscillation circuit. In other words, the charged energy of the capacitor is sent into the plasma ignition plug via the switching element so that the plasma ignition plug performs a plasma ignition. If such a conventional plasma ignition system is applied to the diesel engine or high-compression-ratio gasoline engine, the breakdown voltage to start a plasma spark between the electrodes of the ignition plug will be comparatively large since the pressure at the time of ignition will be comparatively high. Since the breakdown voltage increases as the engine load increases, a misfire often occurs in cases of abrupt acceleration and sudden increase in engine load. To escape the problem described above, if the discharge voltage of each capacitor is increased, such parts as capacitors, switching elements, and diodes require high voltage-resistant characteristics, so that such a plasma ignition system will be expensive and providing sufficient insulation means between each part against such high voltage will also be difficult.

SUMMARY OF THE INVENTION

With the problem described above in mind, it is a primary object of the present invention to provide a plasma ignition system wherein in addition to the construction of the conventional plasma ignition system there is provided an oscillation device to apply a high-frequency oscillation voltage to each plasma ignition plug so as to generate a multiple sparking phenomenon within each plasma ignition plug before the plasma ignition so that the resistance between the electrodes of each plasma ignition plug is reduced by the application of the high-frequency oscillation voltage from early in the piston compression stroke until the plasma ignition timing period ends under low pressure, and over the whole driving range including the timing of engine start-up, so as to secure the plasma ignition with relatively low ignition energy even during the high compression stroke.

BRIEF DESCRIPTION OF THE DRAWINGS

The features and advantages of the present invention will be clearly understood from the following description taken in conjunction with the accompanying drawings in which like reference numerals designate corresponding elements, and in which:

FIGS. 1(A) and 1(B) show a circuit diagram of a conventional plasma ignition system for a four-cylinder high compression ratio engine;

FIG. 2(A) shows a timing chart of each signal sent and received between each circuit block shown in FIGS. 1(A) and 1(B);

FIG. 10 is a timing chart of main signals sent and received between each circuit block shown in FIGS. 9(A) and 9(B).

DESCRIPTION OF THE PREFERRED EMBODIMENTS

Reference will be made to the drawings, and first to FIGS. 1(A) and 1(B) which shows a conventional plasma ignition system for a four-cylinder high compression ratio internal combustion engine. When such plasma ignition system is applied to the diesel engine, a glow system for preheating air-fuel mixture within the respective engine cylinders to start the engine is eliminated.

Figure 1B:
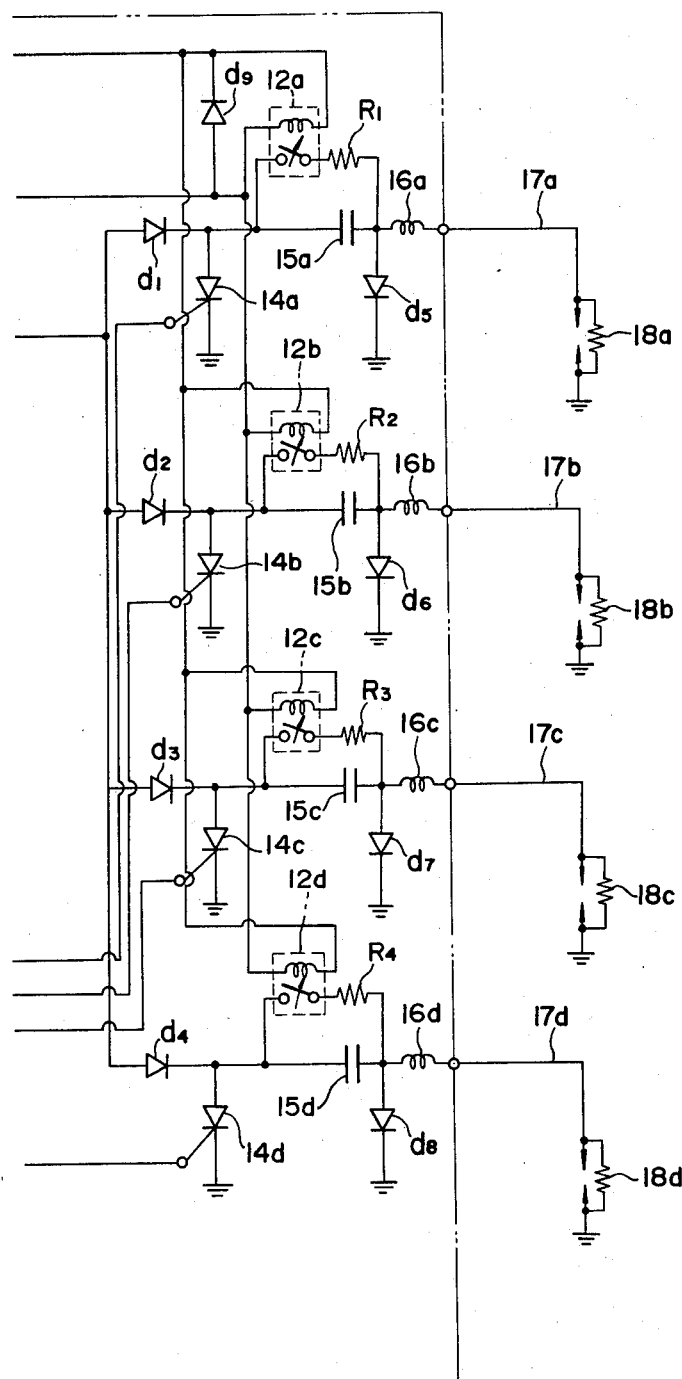
Figure 2B:
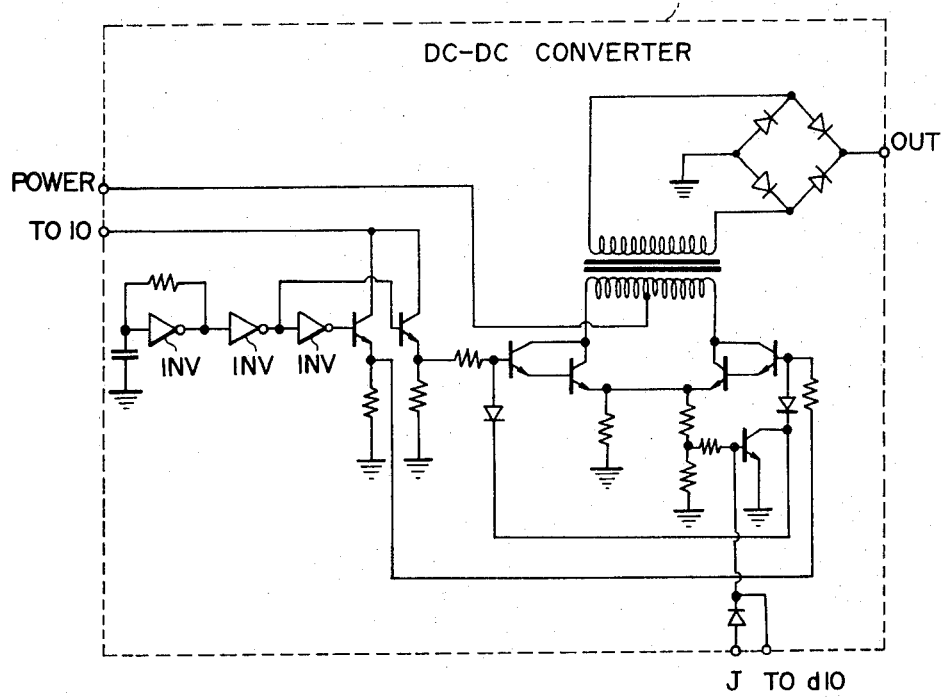
FIG. 2(B) shows an example of DC-DC converter used in a plasma ignition system for an internal combustion engine.
Figure 2C:
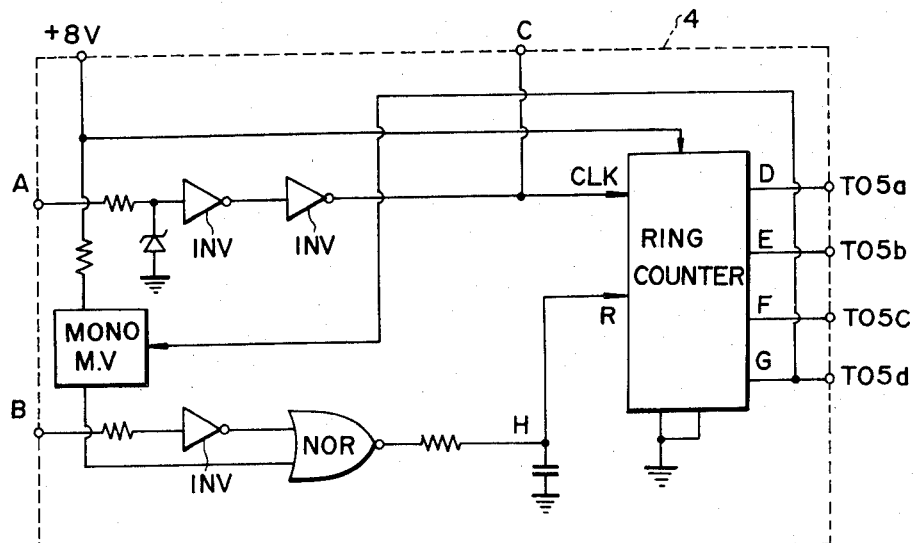
FIG. 2(C) shows the internal configuration of an ignition timing detector of FIG. 1(A)
Figures 6A, 6B:
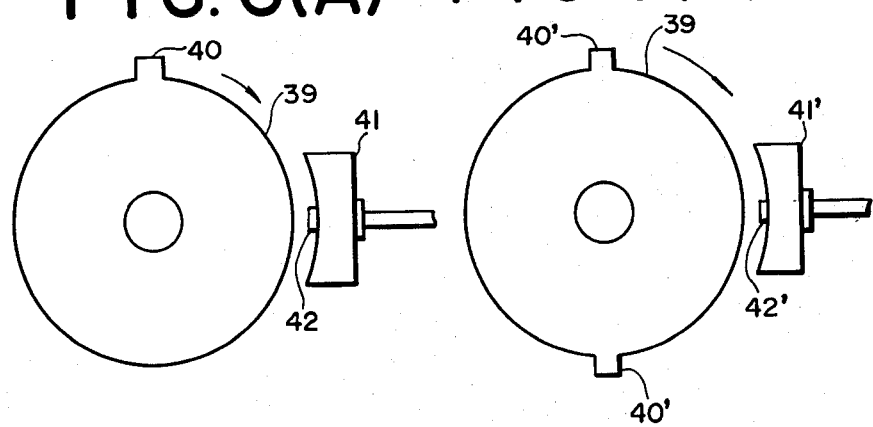
FIG. 6(A) shows an ignition timing disc having a tooth around the circumference and an electromagnetic pickup located near the disc for detecting a passage of the tooth to provide a one-cycle signal of the engine for the plasma ignition system in the first preferred embodiment.
FIG. 6(B) shows a multiple spark start timing disc and electromagnetic pickup having two teeth for detecting a passage of the teeth to provide a multiple spark start timing signal used in a second preferred embodiment according to the present invention.

In FIGS. 1(A) and 1(B), numeral 1 denotes a DC power supply such as a battery of a vehicle. Numeral 2 denotes an overall plasma ignition system, numeral 3 denotes an ignition timing control circuit, numeral 4 denotes an ignition timing detector, numerals 5a through 5d denote trigger signal generators each comprising, e.g., a monostable multivibrator, numeral 6 denotes an oscillation halt circuit comprising, e.g., a monostable multivibrator, numeral 7 denotes a voltage comparator, numeral 8 denotes an operational amplifier of the voltage comparator 7 using a single bias supply system, numeral 9 denotes an ignition switch connected to a negative pole of the DC power supply 1, numeral 10 denotes a power supply switch connected to a positive pole of the DC power supply 1, numeral 11 denotes a first electromagnetic relay whose electromagnetic coil is connected to the ignition switch 9 and to the power supply switch 10, numerals 12a through 12d denote second, third, fourth and fifth electromagnetic relays whose relay contacts are normally open and are closed to discharge each of the capacitors 15a through 15d when the ignition switch 9 is turned off, a freewheel diode $d_9$ connected across the electromagnetic coils 12a through 12d, numeral 13 denotes a DC-DC converter whose input terminals are connected to the power supply switch 10. The internal circuit configuration of the DC-DC converter 13 is shown in FIG. 2(B) in detail. The DC power supply voltage is stepped down by a first zener diode $ZD_1$ connected to the power supply switch 10 to provide a constant DC voltage of, e.g., 12 V as shown in FIG. 1(A) for the DC-DC converter 13. Numerals 14a through 14d denote four reverse blocked triode thyristors (hereinafter simply referred to as thyristors) as four switching elements each gate terminal connected to a corresponding output terminal of one of the trigger signal generators 5a through 5d, each cathode terminal grounded, and each anode terminal connected to the output terminal of the DC-DC converter 13 via each of the diodes $d_1$ through $d_4$. Numerals 15a through 15d denote capacitors which are charged by the ignition energy from the output of the DC-DC converter 13 inputted via each diode $d_1$ through $d_4$. Numerals 16a through 16d denote inductors. Numerals 17a through 17d denote high tension cables, each connected to the corresponding inductor 16a through 16d for preventing the high frequency oscillation wave from radiating externally. Numerals 18a through 18d denote plasma ignition plugs connected between the corresponding high tension cable 17a through 17d and ground. Symbols $R_1$ through $R_4$ denote resistors, each connected between the corresponding capacitor 15a through 15d and relay contact for gradually passing the remaining charge in the corresponding capacitor 15a through 15d via the corresponding diode $d_5$ through $d_8$ to ground when the ignition switch 9 is turned off. Numeral 19 denotes an IC voltage regulator connected to the power supply switch 10 and input terminal of the DC-DC converter 13 for providing a dc voltage of 8 V (corresponding to logic level of "1" in this plasma ignition system) for the ignition timing control circuit 3 and voltage comparator 7. A plasma ignition timing signal A to be inputted at a clock pulse input terminal CLK of the ignition timing detector 4 indicates a pulse train whose period corresponds to a half rotation of the four-cylinder engine as shown in FIG. 2(A). The plasma ignition timing signal A may be obtained by detecting a timing at which a needle valve of each fuel injection valve is lifted to inject fuel by means of a working transformer as an ignition timing signal after fuel injection. A one-cycle signal B to be inputted at a reset terminal denoted by R of the ignition timing detector 4 indicates a pulse signal whose period corresponds to two rotations of the four-cylinder engine as shown in FIG. 2(A). The one-cycle signal B is obtained by means of a sensor comprising a disc 39 having a tooth 40 projected on the periphery thereof fixed on a camshaft which rotates with a crankshaft at a rate half a rotation of the crankshaft and an electromagnetic pickup 41 having an electromagnet 42 which generates an induced electromotive force when the tooth 40 is passed, as shown in FIG. 6(A). In the four-cylinder engine, the one-cycle signal B has a period of crankshaft two rotations (i.e., 720° of rotation angle). The ignition timing detector 4 comprises, e.g., a 4-bit ring counter (or 4-bit shift registor) having four D-type serially connected flip-flops and a NOR gate whose input terminals are connected to Q outputs of the first, second and third D-FFs. The one-cycle signal B is converted into a reset pulse signal H at the trailing edge of the one-cycle signal B as shown in FIG. 2(A). An input circuit configuration of the ignition timing detector 4 is shown in FIG. 2(C). As the ignition signal A is inputted into the ignition timing detector 4, one of the cyclic pulses D, E, F and G is outputted sequentially each time the plasma ignition timing signal A goes high. Each of the output pulses D, E, F and G from the ignition timing detector 4 is sent to the corresponding trigger signal generator 5a through 5d. Each trigger signal generator 5a through 5d comprises, e.g., a monostable multivibrator. When one of the output pulses D through G is sent into the corresponding trigger signal generator 5a through 5d, a trigger signal d through g is generated and fed into the gate terminal of the corresponding thyristor 14a through 14d. At this time the corresponding thyristor 14a through 14d turns on so that an electric charge within the corresponding capacitor 15a through 15d provided for one of the four cylinders is discharged through the corresponding thyristor 14a through 14d, corresponding plasma ignition plug 18a through 18d, high tension cable 17a through 17d, and inductor 16a through 16d. Therefore, the plasma ignition occurs at each of the four cylinders in accordance with the prescribed ignition order. The plasma ignition timing signal A is also fed into the oscillation halt circuit 6 as a signal C as shown in FIG. 1(A). As the plasma ignition timing signal A turns to a "1", the oscillation halt circuit 6 outputs a pulse signal J with about one millisecond width to a stop terminal of the DC-DC converter 13 so that the DC-DC converter 13 oscillation operation is interrupted as seen from FIG. 2(B) so that no high DC voltage is outputted to the corresponding capacitor 15a through 15d during the period of the pulse signal duration. At this time, if one of the corresponding thyristor 14a through 14d is turned on from the time of trigger signal input, the thyristor 14a through 14d is naturally turned off again with the corresponding diode $d_1$ through $d_4$ turned off since the high frequency oscillation current drops below the holding current of each thyristor 14a through 14d. The output voltage of the DC-DC converter 13 is also fed into the voltage comparator 7. In the voltage comparator 7, the output voltage of the DC-DC converter 13 is divided and inputted into a noninverting (positive) terminal of the operational amplifier 8, and the DC voltage of 8 V from the regulator 19 is also divided and inputted into an inverting (negative) terminal of the operational amplifier 8. If the output voltage of the DC-DC converter 13 drops below a prescribed high DC voltage, the operational amplifier 8 does not provide a sufficient voltage via a diode $d_{10}$ for the DC-DC converter stop terminal so that the DC-DC converter 13 resumes oscillating operation. On the contrary, if the output voltage of the DC-DC converter 13 increases above the prescribed voltage, the operational amplifier 8 outputs a positive voltage (8 V) via the diode $d_{10}$ so that the DC-DC converter 13 ceases the oscillating operation.

Since the compressed air or air-fuel mixture incurs a high pressure at the moment of plasma ignition, the ignition voltage needs to be high, particularly at high the engine loads. However, it becomes difficult to insulate these capacitors 15a through 15d thyristors 14a through 14d, diodes $d_5$ through $d_8$, etc., with considerably high voltage characteristic. As a result, the total cost becomes high.

Figure 3A:
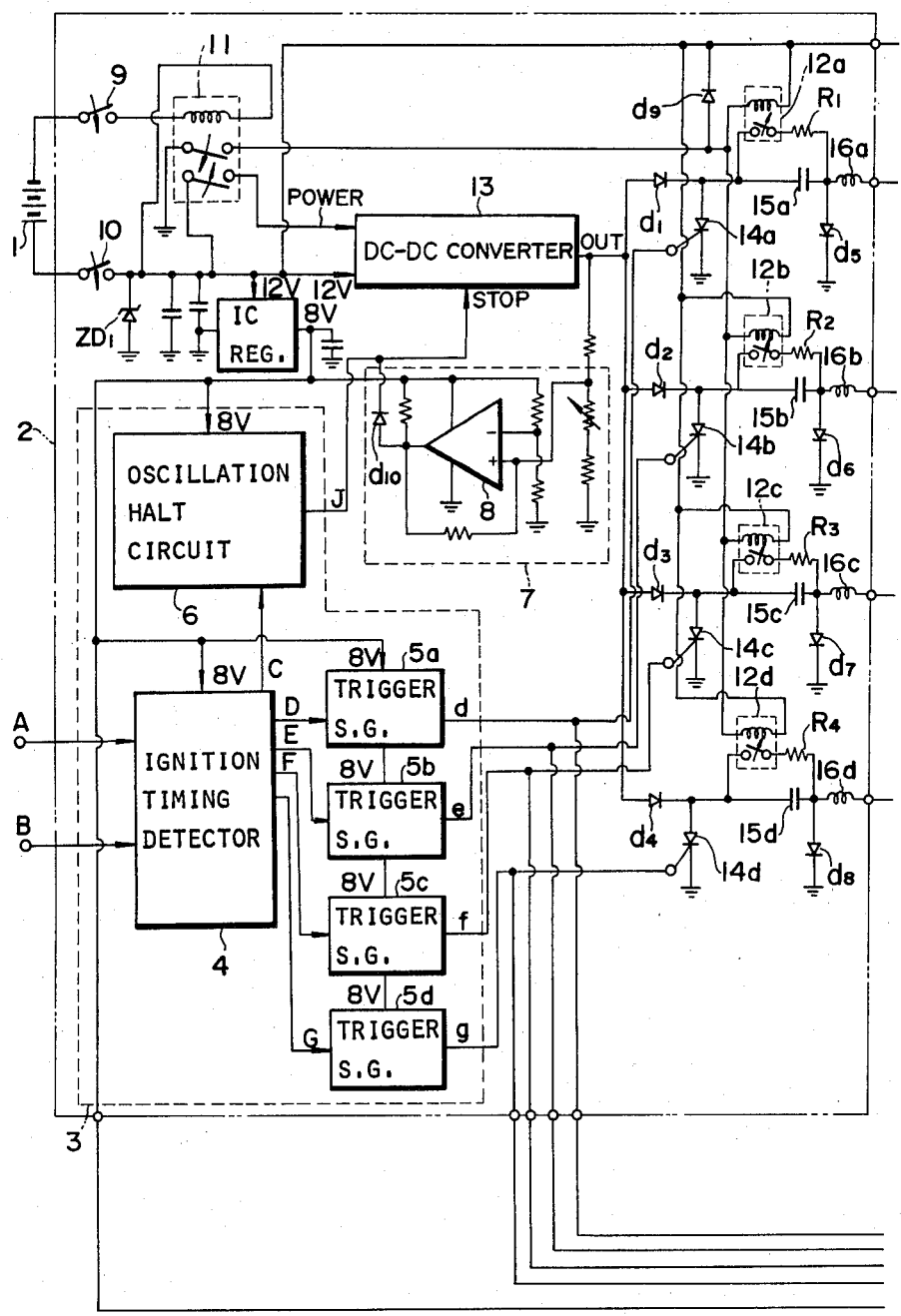
FIGS. 3(A) and 3(B) show a plasma ignition system of a first preferred embodiment according to the present invention.
Figure 3B:
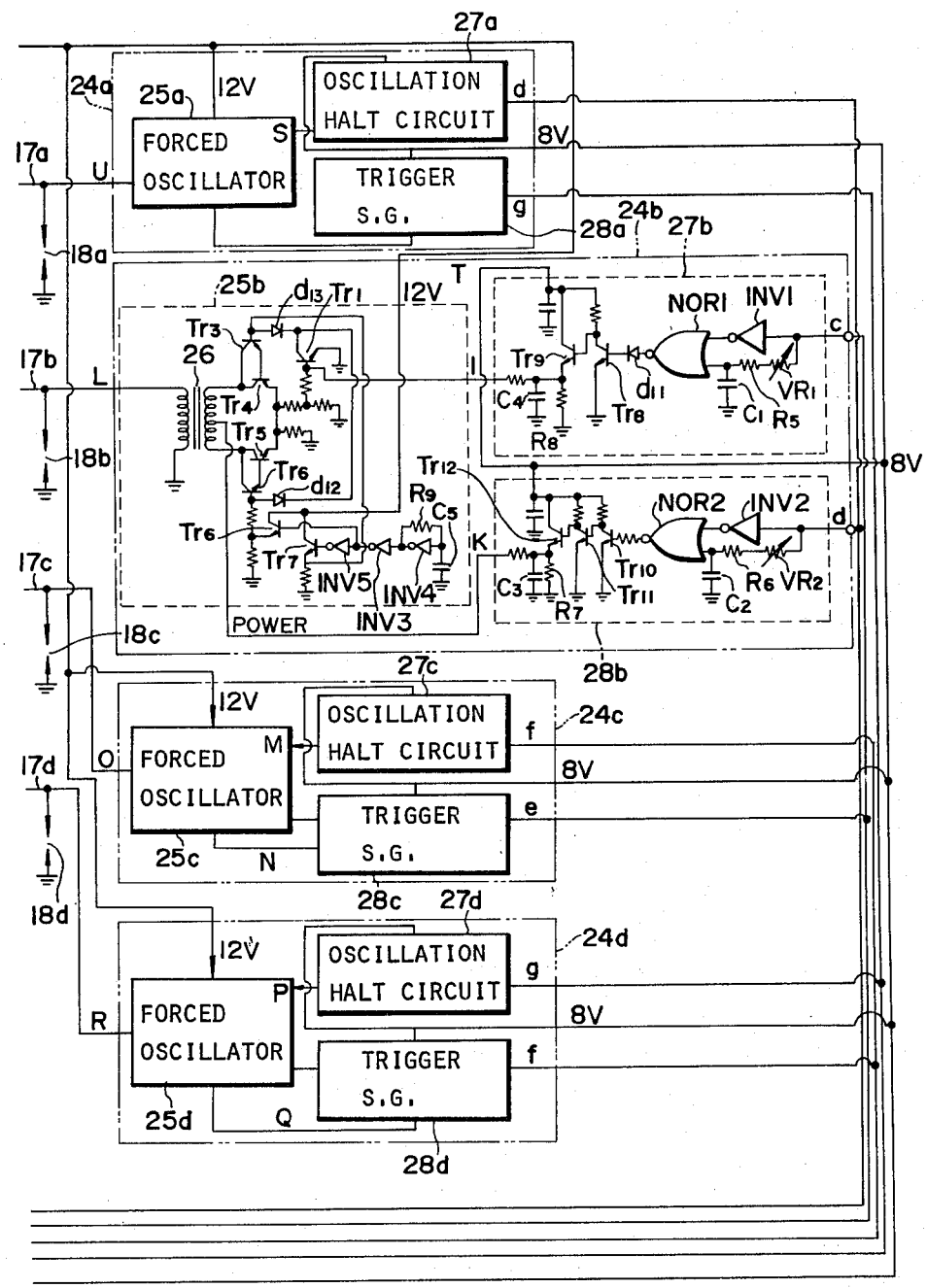

FIGS. 3(A) and 3(B) show a circuit diagram of a plasma ignition system for four-cylinder internal combustion engine having a high compression ratio of a first preferred embodiment according to the present invention. As shown in FIGS. 3(A) and 3(B), the plasma ignition system is provided with separately excited-type oscillation device 24a through 24d connected to each of the four plasma ignition plugs 18a through 18d, in addition to the construction of conventional plasma ignition system as shown in FIGS. 1(A) and 1(B).

Each separately excited oscillation circuit 24a through 24d comprises a push-pull type forced oscillator 25a through 25d, an oscillation halt circuit 27a through 27d, and a trigger signal generator 28a through 28d. The first oscillation halt circuit 27a is connected between the output terminal of the first trigger signal generator 5a and the first oscillator 25a for halting forcefully the oscillation of the first oscillator 25a. The second operation halt circuit 28b is connected between the output terminal of the second trigger signal generator 5b and the second oscillator 26b. The third oscillation halt circuit 28c is connected between the output terminal of the second trigger signal generator 5c and the third oscillator 26c. The fourth oscillation halt circuit 28d is connected between the output terminal of the fourth trigger signal generator 5d and the fourth oscillator 26d. The fifth trigger signal generator 28a is connected between the first oscillator 25a and output terminal of the fourth trigger signal generator 5d. The sixth trigger signal generator 28b is connected between the second oscillator 25b and output terminal of the first trigger signal generator 5a. The seventh trigger signal generator 28c is connected between the third oscillator 25c and output terminal of the second trigger signal generator 5b. The eighth trigger signal generator 28d is connected between the fourth oscillator 25d and output terminal of the third trigger signal generator 5c. Each oscillator 25a through 25d has an ignition transformer 26, the secondary coil of which has one end connected to the corresponding ignition plug 18a through 18d and the other end grounded.

Figure 4A:
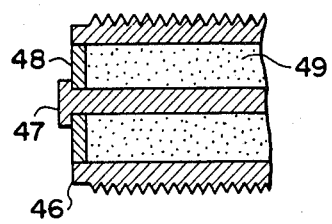
FIGS. 4(A), 4(B) and 4(C) are partial section views of examples of the plasma ignition plugs for an internal combustion engine.

In the first preferred embodiment shown in FIGS. 3(A) and 3(B) the plasma ignition plug of such a construction as shown in either of FIGS. 4(A), (B) and (C) is used. In FIG. 4(A), the ignition plug comprises a central electrode 47, a grounding electrode 46 surrounding the central electrode 47 with a considerable space, and a semiconductor member 48 located at the end of a ceramic member 49 installed in the space between the central and grounding electrodes 47 and 46. Such plasma ignition plug as shown by FIG. 4(A) lacks durability because the semiconductor member 48 itself is susceptible to the applied high voltage or sparking.

Figure 4B:
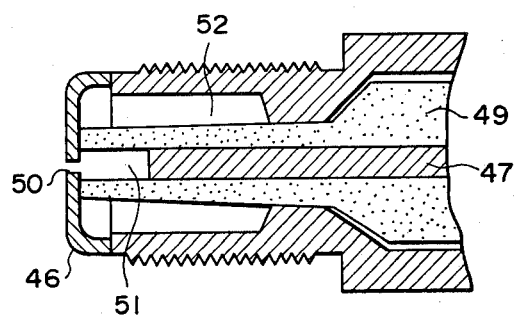

In FIG. 4(B), the plasma ignition plug comprises a cavity 51 surrounded by a ceramic member 49 located between the central and grounding electrodes 47 and 46, an injection hole 50 provided in the grounding electrode 46 for injecting a plasma gas, and a gas space 52 located between the grounding electrode 46 and ceramic member 49.

Figure 4C:
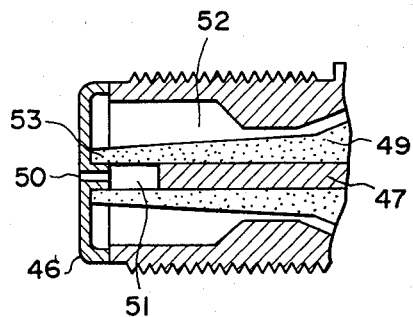

In FIG. 4(C), in addition to the construction shown in FIG. 4(B), a projection 53 is provided at the grounding electrode 46 so as to project within the cavity 51 so that the air-fuel mixture is not ignited at the time of multiple sparking but at the time of plasma ignition when the plasma ignition is carried out during the multiple sparking interval at the ignition plug used in a precombustion chamber-type engine where air and fuel are previously mixed and injected into the main combustion chamber, and in a stratiform-type engine having a thin air-fuel mixture layer and thick air-fuel mixture layer.

The ignition operation in the first preferred embodiment of the plasma ignition system shown in FIGS. 3(A), 3(B), and 3(C) is as follows: When the power supply switch 10 and plasma ignition switch 9 are turned on, the voltage of the DC power supply 1 is converted into an AC voltage and rectified to provide a high DC voltage by means of the DC-DC converter 13 as seen from FIG. 2(B). The output high DC voltage of the DC-DC converter 13 is maintained at a prescribed DC voltage by means of the voltage comparator 7 so that a predetermined amount of ignition energy is charged within each of the capacitors 15a through 15d.

Figure 5:
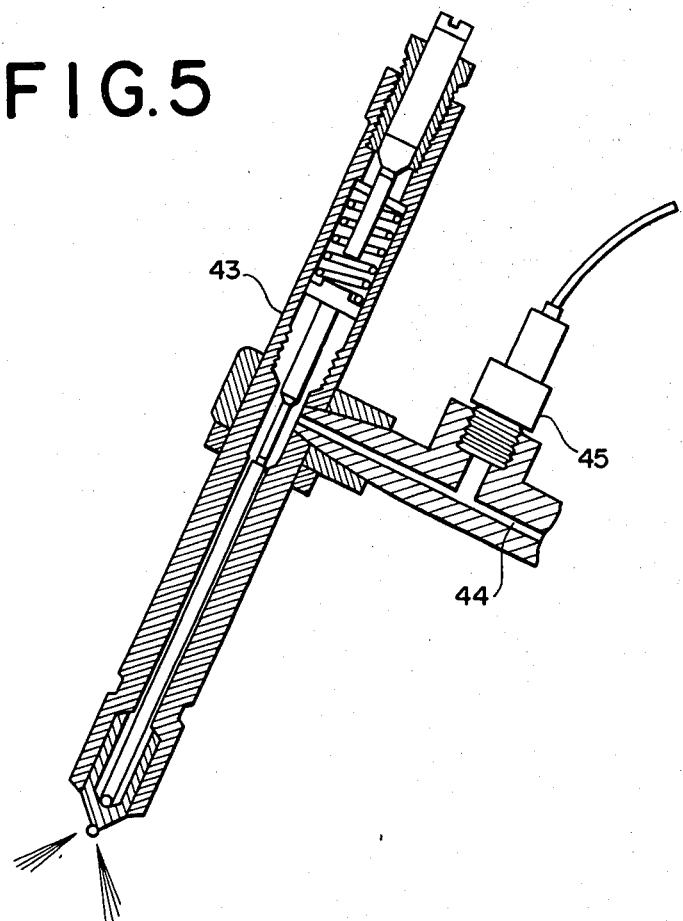
FIG. 5 is a cross-sectional view of a pressure transducer and fuel injection valve of a diesel engine used for detecting the pressure change within the fuel supply tube to provide a plasma ignition timing signal for the plasma ignition system.
Figure 7:
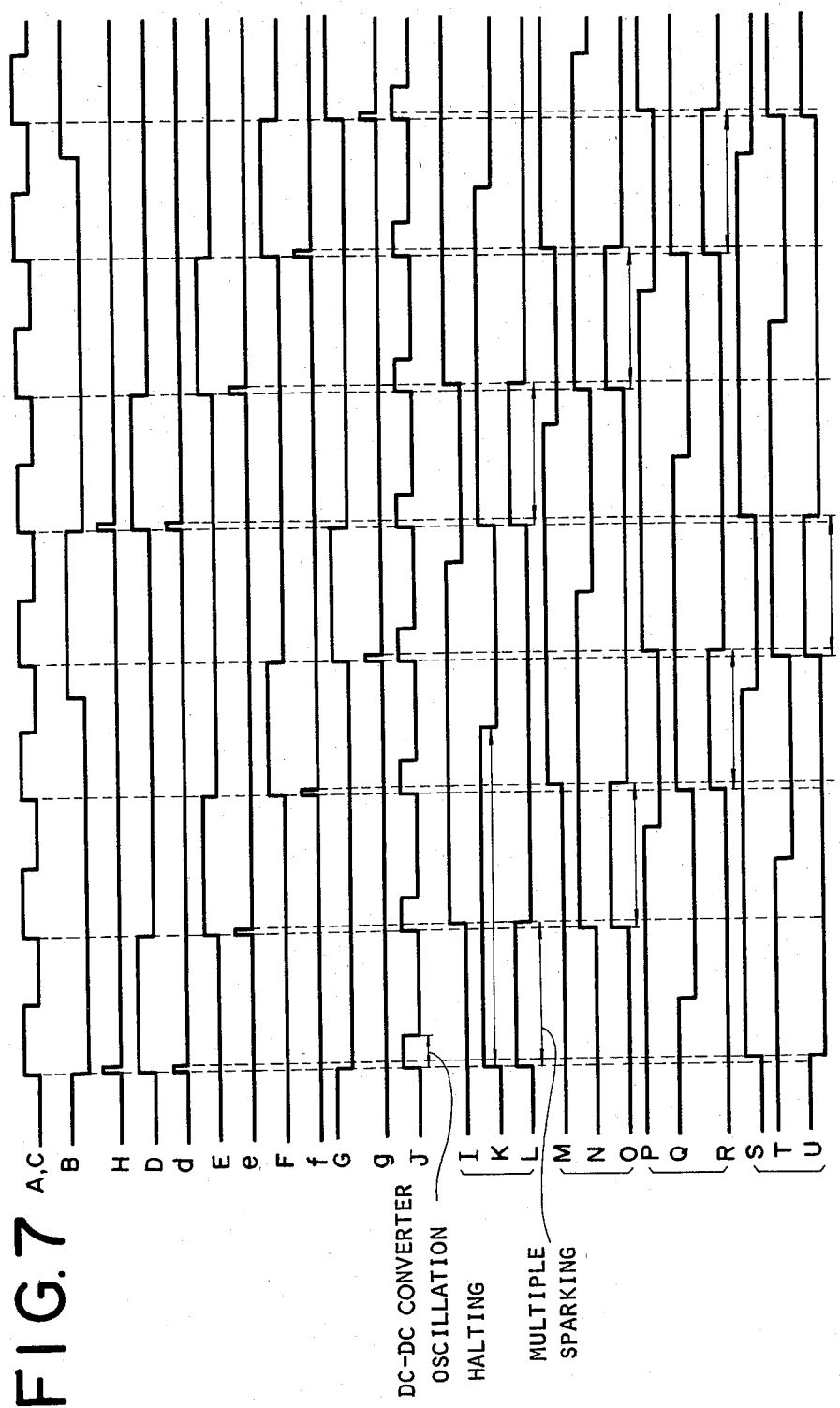
FIG. 7 shows a timing chart of each signal sent and received by the circuit blocks of the plasma ignition system in the first preferred embodiment.

The input terminal CLK of the ignition timing detector 4 is connected to, e.g., a pressure transducer 45 which detects a pressure change in the fuel supply tube 44 connected to each fuel injection valve 43 as shown in FIG. 5 and signals the pressure change to the ignition timing detector 4 as the plasma ignition timing signal A. As shown in FIG. 7, the plasma ignition timing signal A has a period corresponding to a half rotation (180° in rotation angle) of the engine crankshaft in the four-cylinder engine. The period of the plasma ignition timing signal A depends on the number of cylinders.

The input terminal R of the ignition timing detector 4 is connected to the electromagnetic pickup 42, which detects the tooth 40 of the ignition timing disc 39 fixed on the camshaft rotating half as fast as the crankshaft as shown in FIG. 6(A), and signals one rotation of the ignition timing disc 39 as the engine one-cycle signal B having a period corresponding to, one engine cycle, i.e., two rotations (720° in rotation angle) of the crankshaft in the case of the four-cylinder engine as shown in FIG. 7.

The plasma ignition timing signal A may also be obtained by detecting the movement of the needle valve in the fuel injection valve through a transformer, light emitter and receiver (photocouple), magnetic field responsive device, and so on. Alternatively, as shown in FIG. 6(B) another ignition timing disc 39' having two teeth 40' positioned opposite each other with respect to the center point may be fixed on the crankshaft to obtain the 180°-phase plasma ignition signal A substantially synchronized with the phase of fuel supply timing in the case of the four-cylinder engine. These signals A and B thus obtained are fed into the ignition timing detector 4. Since the ignition timing detector 4 is a ring counter, the one-cycle signal B is shaped into a reset pulse H at the falling edge of the one-cycle signal B to reset the ignition timing detector 4 to zero as an initializing stage as shown in FIG. 2(C) In this state, the ignition timing detector 4 receives the signal A whose period corresponds to 180° of the rotation angle of the engine crankshaft and outputs a pulse D through G, with the pulse width corresponding to the period of the signal A, at each of four output terminals of the ignition timing detector 4 sequentially until the subsequent reset pulse H is inputted. The outputted signals D through G are sent into the trigger signal generators 5a through 5d respectively, the outputted signal D to the first trigger signal generator 5a, the outputted signal E to the second trigger signal generator 5b, the outputted signal F to the third trigger signal generator 5c, the outputted signal G to the fourth trigger signal generator 5d. Since each trigger signal generator 5a through 5d is, e.g., a monostable multivibrator, the first trigger signal generator 5a outputs a trigger signal d to the first thyristor 14a. Similarly, each trigger signal generator 5a through 5d outputs a trigger signal d through g to the gate terminal of the corresponding thyristor 14a through 14d whenever the plasma ignition signal of 180° phase of engine crankshaft rotation angle is inputted. Immediately after each thyristor 14a through 14d turns on, the charged ignition energy within the corresponding capacitor 15a through 15d is discharged via the corresponding plasma ignition plug 18a through 18d sequentially. At the same time, the trigger signal d through g is fed into the corresponding trigger signal generator 28b, 28c, 28d, or 28a of the corresponding oscillator 25b, 25c, 25d, and 25a connected to the corresponding ignition plug 18b, 18c, 18d, and 18a to be ignited next, so that the oscillators 25b through 25a are actuated sequentially. Furthermore, each of the trigger signals d through g is fed into the corresponding oscillation halt circuit 28a through 28d connected to the corresponding oscillator 25a through 25d for each of the ignition plugs 18a through 18d, so that the operation of each oscillator 25a through 25d is halted at an appropriate timing.

For example, when the trigger signal d is outputted from the first trigger signal generator 5a to turn on the first thyristor 14a, the first capacitor 15a discharges the charged energy to perform the plasma ignition at the first ignition plug 18a and the trigger signal d is also fed to the sixth trigger signal generator 28b connected to the second oscillator 25b which corresponds to the second plasma ignition plug 18b, which is to be ignited after the first plasma ignition plug 18a. The sixth trigger signal generator 28b comprises a monostable multivibrator having, e.g., an inverter INV2 connected in parallel with an integrating circuit having a capacitor $C_2$, resistor $R_6$ and variable resistor $VR_2$ in series, a NOR gate NOR2 whose input terminals are connected to the inverter INV2 and to the integrating circuit, three inverters including three transistors $Tr_{10}$, $Tr_{11}$ and $Tr_{12}$, and a charge-discharge circuit, having a capacitor $C_3$ and resistor $R_7$ connected in parallel, all connected in series. The transistor $Tr_{12}$ is turned on only when the first trigger signal d from the first trigger signal generator 5a is inputted and the charge-discharge circuit discharges the voltage charged within the capacitor $C_3$ through the resistor $R_8$ to produce a sixth trigger signal K. The construction of the other fifth, seventh, and eighth trigger signal generators is the same as shown in the sixth trigger signal generator 28b. The output trigger signal K of the sixth trigger signal generator 28b is fed into the second oscillator 25b so as to actuate the second oscillator 25b. The oscillation output L (the duration of oscillation, that is, the multiple sparking period as shown in FIG. 7) is applied across the second plasma ignition plug 18b to start the multiple sparking. Simultaneously, the trigger signal d is also fed into the first oscillation halt circuit 27a connected to the first oscillator 25a so that the output signal S of the oscillation halt circuit 27a causes the first oscillator 25a to halt its oscillating operation as shown in FIG. 7. The second trigger signal e subsequently outputted from the second trigger signal generator 5b turns on the second thyristor 14b so that the charge within the second capacitor 15b is discharged and then the corresponding plasma ignition plug 18b performs the plasma ignition. The trigger signal e is also fed into the seventh trigger signal generator 28c connected to the third oscillator 25c so that the output trigger signal N of the seventh trigger signal generator 28c causes the oscillation circuit 25c to operate and the oscillation output O is applied across the plasma ignition plug 18c to start the subsequent multiple sparking. The trigger signal e is furthermore fed into the second oscillation halt circuit 27b connected to the second oscillator 25b for the second plasma ignition plug 18b. The second oscillation halt circuit 27b comprises a monostable multivibrator having, e.g., an inverter INV1, an integrating circuit having a capacitor $C_1$, resistor $R_5$, and a variable capacitor $VR_1$, a NOR gate whose input terminals are connected to the inverter INV1 and to the integrating circuit as described for the trigger signal generator 28b, a diode $d_{11}$ connected to the output terminal of the NOR gate NOR1, two inverters having two transistors $Tr_8$ and $Tr_9$, and a charge-discharge circuit having a capacitor $C_4$ and resistor $R_8$ in parallel, all connected in series. The transistor $Tr_9$ is turned on only when the second trigger signal e from the second trigger signal generator 5b is inputted and the charge-discharge circuit discharges the voltage charged within the capacitor $C_4$ through the resistor $R_8$ to produce an oscillation halt signal I. Therefore, the output signal I causes the operation of the second oscillator 26b to be halted. The same operation is performed sequentially so that the ignition according to the present invention of each ignition plug 18a through 18d is repeated for each cycle (two engine rotations).

Figure 8:
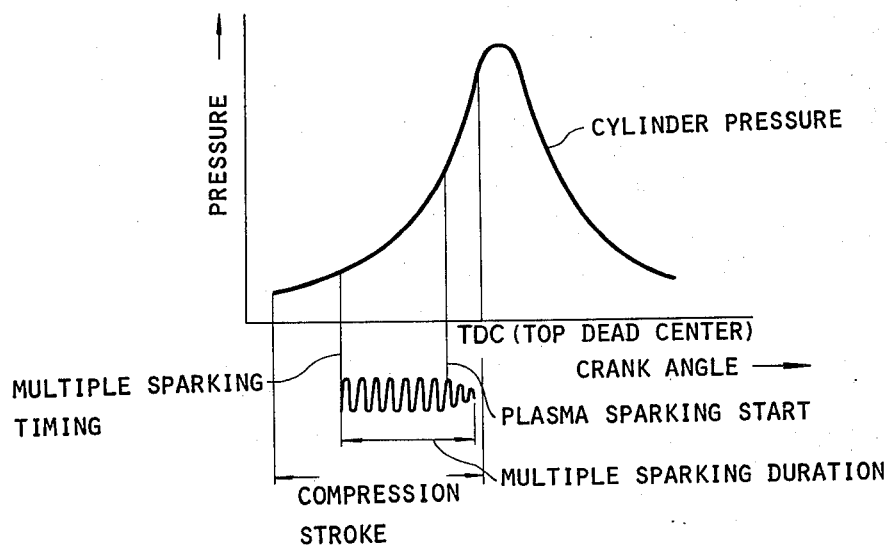
FIG. 8 shows a graph of the internal pressure of each cylinder with respect to the crank angle to explain the timing of multiple sparking and plasma ignition.

In other words, the ignition of each ignition plug 18a through 18d is performed in such a way that the multiple sparking between the electrodes of one of the ignition plugs 18a through 18d starts at an early stage of the engine compression stroke and ends immediately before the engine piston corresponding to the ignition plug arrives at the top dead center (TDC), the plasma sparking being carried out while the multiple sparking continues as shown in FIG. 8.

According to the present invention, the energy of the individual multiple sparking may be relatively low (i.e., the amplitude of the multiple sparking wave may be relatively small) and its oscillation frequency is relatively high, preferably at a frequency between several KHz and several tens of KHz in order that many electrons and ions be present continuously between both electrodes so that the plasma sparking voltage does not increase even when the cylinder pressure becomes high during the compression stroke. That is, it is efficient to continue such a multiple sparking at the earlier stage of the plasma ignition because the multiple sparking produces ions and radicals (combustion activating substance), which facilitate the plasma ignition in the vicinity of the central and grounding electrodes of each plasma ignition plug. Therefore, the timing at which the plasma ignition is performed is during the multiple sparking, so that the resistance between the electrode of the ignition plug decreases because of the generated electrons and ions. Consequently, the voltage used to charge into each of the capacitors 15a through 15d may be set relatively low.

Figure 9A:
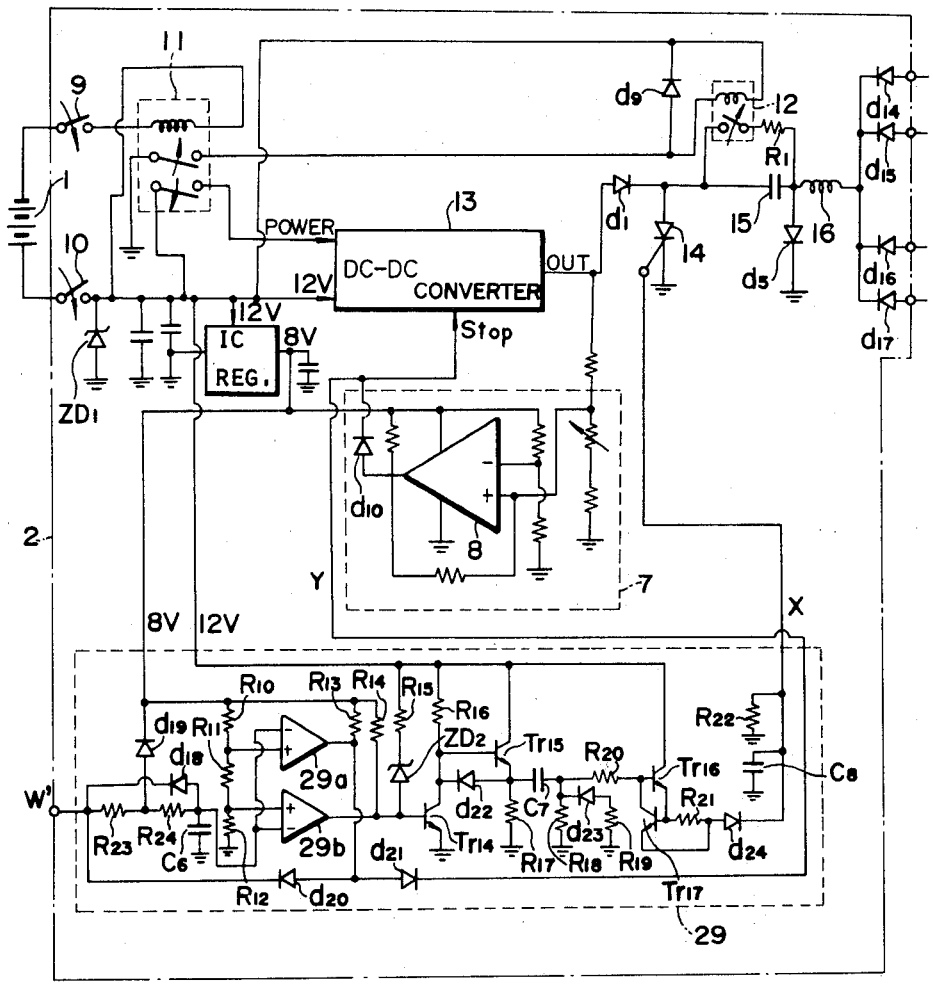
FIGS. 9(A) and 9(B) show a circuit diagram of the plasma ignition system of the second preferred embodiment according to the present invention.
Figure 9B:
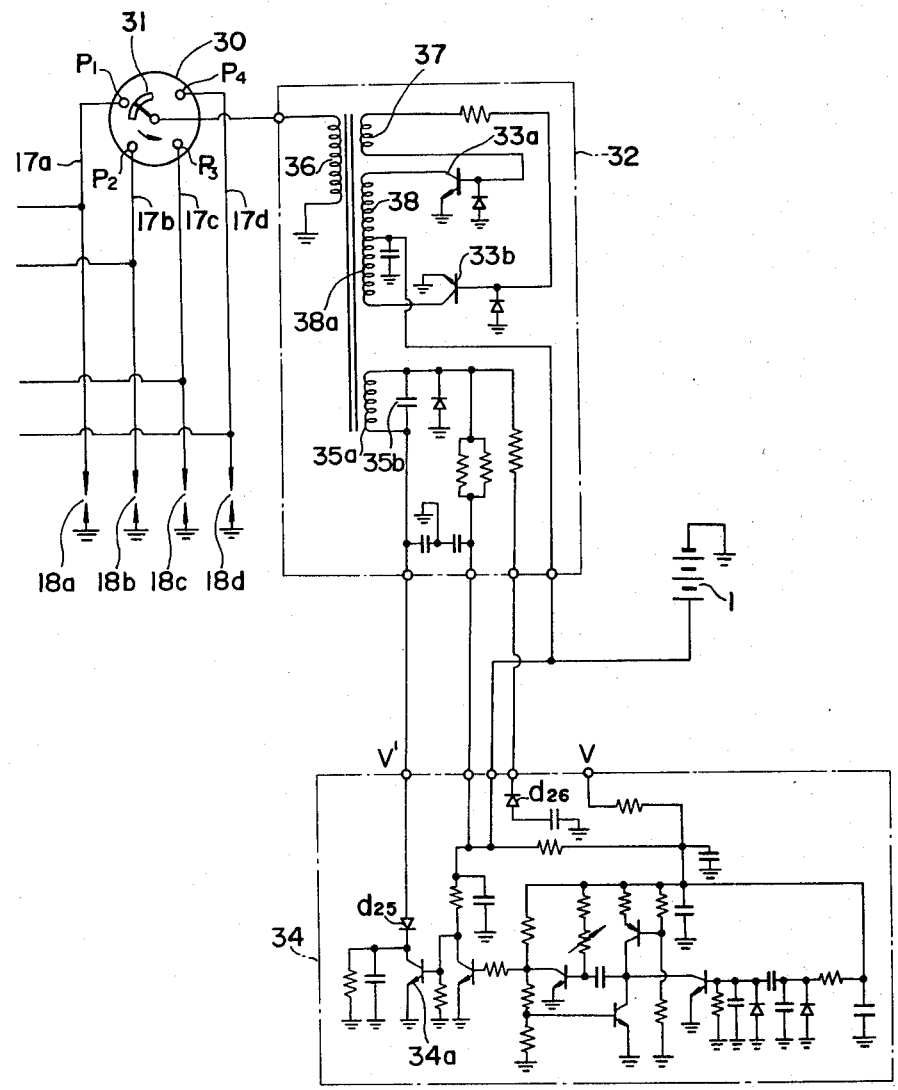

FIGS. 9(A) and 9(B) show a second preferred embodiment of the plasma ignition system according to the present invention, wherein the oscillation device is of the self-oscillation type and an ignition distributor is used.

In FIGS. 9(A) and 9(B), both a multiple spark start signal V, which determines the start timing of the multiple spark during the compression stroke of each cylinder of the engine and the plasma ignition signal W', the waveform of which is derived from an original plasma ignition signal W as shown in FIG. 10, which determines the start timing of the plasma ignition, may be obtained in the same way as the plasma ignition timing signal A is obtained in the first preferred embodiment shown in FIGS. 3(A) and 3(B), provided that the plasma ignition signal W is provided with a phase delay with respect to the multiple spark start signal V as seen from FIG. 10. In the case of direct-injection-type internal combustion engine having a high compression ratio where the fuel is injected directly into the combustion chamber, e.g., the multiple spark start signal V is obtained by detecting the passage of the two teeth 40', projecting from the circumference of the ignition timing disc 39' fixed on the engine crankshaft as shown in FIG. 6(B), which pass through the magnetic field produced by the electromagnetic pickup 42' ever half-rotation of the crankshaft in the four-cylinder engine. Furthermore, the original plasma ignition signal W can be obtained by detecting the pressure change within the fuel supply tube 44 connected to each fuel injection valve 43 shown in FIG. 5, by detecting the movement of the needle valve of the injection valve through a working transformer, etc. The electromagnetic relay 12 connected to the resistor $R_1$, thyristor 14, capacitor 15, inductor 16, and diode $d_5$ are used in common for all cylinders, as seen in FIGS. 9(A) and 9(B) because of the adoption of a distributor 30.

Numeral 29 denotes a delay trigger signal generator which receives a square-wave plasma ignition signal W' shown in FIG. 10 by means of, e.g., two series-connected inverters not shown in FIGS. 9(A) and 9(B) and generates a series of trigger signals X as shown in FIG. 10 for turning on the thyristor 14 whenever the plasma ignition signal W is inputted and at substantially the same time generates a halt signal Y shown in FIG. 10 for halting the oscillation of the DC-DC converter 13 so as not to output the high DC voltage into the charging capacitor 15. The delay trigger signal generator 29 comprises, e.g., a triangle-wave-shaping circuit having a capacitor $C_6$, diode $d_{18}$, and resistors $R_{23}$ and $R_{24}$, two level comparators having two operational amplifiers 29a and 29b whose inverting input terminals are connected to the output terminal of the triangle-wave-shaping circuit, an output terminal of one operational amplifier 29a being connected to the stop terminal of the DC-DC converter 13 via a diode $d_{21}$, the output terminal of the other operational amplifier 29b being connected to a transistor $Tr_{14}$. The delay trigger signal generator 29 further comprises a transistor $Tr_{15}$, the base of which is connected to the collector of the transistor $Tr_{14}$, and a differentiating circuit. The differentiating circuit comprises a capacitor $C_7$ connected between the emitter of the transistor $Tr_{15}$ and two parallel legs, the first including two parallel sublegs including resistors $R_{18}$ and $R_{19}$ respectively, both resistors connected to ground and $R_{19}$ also connected serially to a diode 23, and the second leg including a resistor $R_{20}$ connected to the base of transistor $Tr_{16}$ and the collector of transistor $Tr_{17}$. The collector of $Tr_{16}$ is connected to the 12 volt bias supply line and its emitter is connected to the base of transistor $Tr_{17}$ in parallel with a resistor $R_{21}$. Resistor $R_{21}$ and the emitter of transistor $Tr_{17}$ are connected in parallel to a diode $D_{24}$, the output of which, with minor modification, is the trigger signal X. Numeral 34 denotes a multiple ignition control circuit which receives the multiple spark start signal V and outputs an oscillation drive signal V' into a multiple spark self-oscillation circuit 32. The self-oscillation circuit 32 starts oscillation spontaneously when an output transistor 34a of the multiple ignition control circuit 34 is turned off to send the oscillation drive signal into the multiple spark self-oscillation circuit 32 to stop the power supply to an ignition primary coil 35a of the multiple spark self-oscillation circuit 32, the ends of which are connected across a capacitor 35b to form an oscillation circuit. At this time, the voltage produced at an ignition secondary coil 36 is fed back into a feedback coil 37, whereby the transistors 33a and 33b connected to the feedback coil 37 are alternatingly turned on and off to send the primary current alternatingly into the ignition primary coils (self-excited oscillation coil) 38 and 38a, so that an oscillation continues for a fixed period of time and damped as shown in FIG. 10 and the ignition secondary coil 36 outputs a multipled oscillation voltage Z. The oscillating voltage Z is applied sequentially to each ignition plug 18a through 18d via the discharging-period-determining rotor 31 of the distributor 30 and the high tension cable 17a through 17d. The ignition operation by means of the plasma ignition system of the second preferred embodiment is carried out as described below. The operation sequence after turning on the power supply switch 10 and until the capacitor 15 is discharged is the same as described in the first preferred embodiment shown in FIGS. 3(A) and 3(B).

The multiple spark start signal V produced by, e.g., the electromagnetic pickup 42' of the ignition timing detector 41' shown by FIG. 6(B) (the waveform of which is shown in FIG. 10) is inputted into the multiple spark control circuit 34. Whenever the multiple spark start signal V goes high, the output transistor 34a of the multiple sparking control circuit 34 is turned off so that the voltage applied to a first ignition primary coil 35a of the multiple ignition output circuit 35 is interrupted. Therefore, oscillation between the first ignition primary coil 35a and capacitor 35b develops. In the ignition secondary coil 36, the high-frequency secondary oscillating voltage Z is generated due to mutual induction. The oscillating voltage Z generated at the ignition secondary coil 36 is fed via a discharge-period-determining rotor 31 of the distributor 30 and, e.g., high tension cable 17a into the ignition plug 18a to start the multiple sparking. The secondary ignition voltage Z is, furthermore, fed back into the feedback coil 37 of the multiple spark oscillation circuit 32 to turn on and off alternatingly transistors 33a and 33b, the collectors of which are connected to opposite ends of second ignition primary coils 38 and 38a to provide the DC voltage from the battery 1 alternatingly to the second primary coils 38 and 38a, the intermediate dividing the second primary coils 38 and 38a connected to a capacitor and the DC power supply 1, so that the oscillating high voltage is induced at the ignition secondary coil 36. In this way, a self-oscillation continues for a fixed interval of several tens of milliseconds by repeating the operation as described above. The multiple sparking generated at each of the ignition plugs 18a through 18d continues for the same period as the self-oscillation continues. While the multiple sparking continues, the plasma ignition signal W' obtained from, e.g., the pressure transducer 45 of the fuel injection valve 43 shown in FIG. 5 (refer to FIG. 10) is fed into the delay trigger signal generator 30, one output terminal of which is connected to the gate terminal of the thyristor 14 and the other to the stop terminal of the DC-DC converter 13. The delayed output trigger signal X is fed into the gate of the thyristor 14 for turning on the thyristor 14 so that the charged energy within the capacitor 15 is discharged through the high tension cable 17a and inductor 16. Consequently, e.g., the plasma ignition plug 18a, for which the resistance between the electrodes is reduced at a minimum due to the multiple sparking, carries out the subsequent plasma ignition. While the plasma ignition is carried out, the oscillation halt signal Y (refer to FIG. 10) is outputted from the delay trigger circuit 29 to halt the operation of the DC-DC converter 13 so as to interrupt the charging of the capacitor 15. In this way, each time the multiple spark start signal V goes high, the self-oscillation output Z is outputted from the ignition secondary coil 36 of the multiple ignition output circuit 33 into the electrode of one of the plasma ignition plugs 18a through 18d selected sequentially by means of the discharging-period-determining rotor 32 of the distributor 30, so that the multiple sparking occurs at the sequentially selected plasma ignition plug 18a through 18d. During the multiple sparking of the appropriate ignition plug 18a through 18d, the delayed trigger signal X obtained by the delay trigger signal generator 29 causes the sequentially-selected plasma ignition plug 18a through 18d to carry out the plasma ignition. The plasma ignition signal W' may be obtained from a phase delay circuit not shown in FIGS. 9(A) and 9(B) which delays the phase of the multiple spark start signal V. In this manner, the plasma ignition system according to the present invention can also be applied to a carburetor-type internal combustion engine.

Since the fuel injection timing is changed according to the variation of engine load and speed, according to the present invention the multiple sparking is always followed by the fuel injection, even when the timing of fuel injection is varied, and thereafter the plasma ignition is performed. Instead of the thyristor(s) 14 and 14a through 14d used in the first and second preferred embodiments, other electronic switching element(s) such as power transistor(s) may be used.

According to the present invention, since there is provided an oscillation device in the conventional plasma ignition system for an internal combustion engine having a high compression ratio including a diesel engine wherein an oscillation output voltage is fed into each plasma ignition plug sequentially through an ignition coil for multiple sparking so as to generate multiple sparking for a given period of time from an early stage of the compression stroke in the internal combustion engine and during the multiple sparking the plasma ignition is performed at the respective plasma ignition plugs, the following advantages can be achieved:

(1) secure plasma ignition without misfire can be performed even at high compression ratios since the breakdown voltage of the plasma spark of the ignition plug can be set lower;

(2) secure plasma ignition without misfire can also be performed in the diesel engine which employs fuel whose cetane number is relatively low, and in the diesel engine of the precombustion-chamber type, wherein the compression ratio is relatively high with an ultra-thin air-fuel mixture, or of a stratiform type; and (3) parts with considerably low voltage-resistant characteristic with relatively low cost can be used for the ignition energy charging capacitor(s), diodes, and switching elements such as thyristor(s).

In addition, in every type of diesel engine, since ignition timing is controlled with regard to plasma ignition instead of spontaneous combustion, reduction of combustion noise and gas emission and lower fuel consumption can be achieved. In precombustion- or stratiform-type diesel engines, the compression ratio can be increased and air-fuel mixture can be thinned to reduce fuel consumption markedly. The ions and radicals can be produced in the vicinity of the electrodes of each plasma ignition plug at the earlier stage before the plasma ignition so as to secure the plasma ignition.

It will be understood by those skilled in the art that the foregoing description is in terms of preferred embodiments of the present invention where various changes and modifications may be made without departing from the spirit and scope of the present invention, which is to be defined by the appended claims.

What is claimed is:

1. A plasma ignition system for a multicylinder internal combustion engine having a high compression ratio, each cylinder being provided with a plasma ignition plug, which comprises:
   (a) a plasma ignition energy generating circuit which generates plasma ignition energy, said circuit having (1) at least one capacitor which charges to a predetermined high DC voltage and operatively discharges the predetermined high DC voltage into said plasma ignition plugs according to a predetermined ignition order and (2) at least one inductor means, connected between said capacitor and each of the plasma ignition plugs, which operatively receives the predetermined high DC voltage discharged by said capacitor;
   (b) an oscillation device having at least one oscillator means which operatively generates a high-frequency oscillation voltage; and
   (c) means connected to said plasma ignition energy generating circuit and oscillation device for controlling the discharge of said capacitor so as to apply the DC voltage within said capacitor to one of the plasma ignition plugs at a predetermined ignition timing of the corresponding engine cylinder according to a predetermined ignition order and, at the same time, for actuating said oscillation device to apply the high-frequency oscillation voltage to one of the remaining plasma ignition plugs installed within the engine cylinder which is substantially in the start of compression stroke until at least the plasma ignition is started at the remaining plasma ignition plug by subsequent application of said DC voltage whereby a complete combustion of air-fuel mixture supplied into the engine cylinders can be achieved for a high-compression engine.

2. A plasma ignition system for a multicylinder internal combustion engine as set forth in claim 1, wherein said plasma ignition energy generating circuit comprises:
   (a) a DC-DC converter connected to a low DC voltage power supply for converting the low DC voltage into an AC voltage and rectifying the AC voltage into the predetermined high DC voltage;
   (b) a voltage comparator for comparing a divided voltage of the output DC voltage of said DC-DC converter with a reference voltage to halt the operation of the DC-DC converter so as to maintain the output voltage of the DC-DC converter at the predetermined high DC voltage;
   (c) said at least one capacitor being a plurality of capacitors equal in number to that of the plasma ignition plugs;
   (d) a plurality of switching elements, each connected to the corresponding capacitor for operatively passing the ignition energy discharged from the corresponding capacitor into the corresponding plasma ignition plug when turned on by said controlling and actuating means; and
   (e) said at least one inductor being a plurality of inductors, each connected between the corresponding capacitor and plasma ingition plug,
   said controlling and actuating means comprises:
   (f) an ignition timing detector which inputs a plasma ignition timing signal generated according to the engine revolutional speed and outputs a pulse signal cyclically at a plurality of output terminals thereof at each predetermined ignition timing of the engine cylinders whenever the plasma ignition timing signal is inputed;
   (g) a first group of trigger signal generators, each trigger signal generator connected to one of said plurality of output terminals of said ignition timing detector and responsive to the output pulse signal of said ignition timing detector for generating and outputting a trigger signal to one of said plurality of switching elements to turn on said switching element; and
   (h) a first oscillation halt circuit connected to the ignition timing detector for outputting an oscillation halt signal with a fixed duration to said DC-DC converter for halting the output operation of said DC-DC converter so as to turn off each of said switching elements upon the completion of the discharge of said corresponding capacitor whenever the ignition timing detector outputs the pulse signal into one of said trigger signal generators,
   and wherein said oscillation device comprises:
   (i) a second group of trigger signal generators, each trigger signal generator of said second group connected to one of said first group of trigger signal generators which corresponds to the plasma ignition plug within the corresponding engine cylinder which has previously been plasmaignited, for outputting a first voltage signal for a fixed interval of time whenever the trigger signal generator of said first group connected thereto outputs the trigger signal to said corresponding switching element;
   (j) a second group of oscillation halt circuits, each oscillation halt circuit of said second group connected to the corresponding trigger signal generator of said first group for outputting a second voltage signal for a fixed interval of time after the first voltage signal of said corresponding one of trigger signal generators of said second group is outputted whenever the corresponding trigger signal generator of said first group outputs the trigger signal to the corresponding switching element; and
   (k) a group of forced oscillation circuits, each forced oscillation circuit connected to the corresponding plasma ignition plug, corresponding oscillation halt circuit of said second group, and corresponding trigger signal generator of said second group for generating and applying the high-frequency oscillation voltage to the corresponding plasma ignition plug during the time when the first voltage signal from the trigger signal generator of said second group is received and then the second voltage signal from the oscillation halt circuit of said second group is received so that the high-frequency oscillation voltage is applied to the corresponding ignition plug installed within the engine cylinder while the engine cylinder is substantially between the start of compression stroke and end of compression stroke.

3. A plasma ignition system for a multi-cylinder internal combustion engine as set forth in claim 2, wherein each of said forced oscillation circuits comprises:
   (a) a push-pull-type amplifier having an ignition transformer, the secondary coil of which is connected to the corresponding plasma ignition plug, opposite ends of the primary coil of which are connected to the collectors of first and second transistors, and the intermediate tap of the primary coil of which is connected to the output terminal of the corresponding trigger signal generator of said second group;

(b) a pulse generating circuit which generates and outputs a pulse train for turning on and off alternatingly the first and second transistors; and (c) a third transistor, the base of which is connected to the output terminal of the corresponding oscillation halt circuit of said second group for forcefully turning off the first and second transistors while the output voltage signal from the corresponding oscillation halt circuit of said second group is inputted so that the oscillation of said forced oscillation circuit is halted.

4. A plasma ignition system for a multi-cylinder internal combustion engine as set forth in claim 2 or 3, wherein each of said second group oscillation halt circuits comprises a monostable multivibrator.

5. A plasma ignition system for a multi-cylinder internal combustion engine as set forth in claim 2 or 3, wherein each of said second group trigger signal generators comprises a monostable multivibrator.

6. A plasma ignition system for a multi-cylinder internal combustion engine as set forth in claim 2, wherein said ignition timing detector also inputs a reset pulse whenever the plasma ignition signal is inputted by the number equal to that of the cylinders which corresponds to one cycle of the engine.

7. A plasma ignition system for a multi-cylinder internal combustion engine as set forth in claim 2, wherein the serial plasma ignition timing signal to be inputted into said ignition timing detector is obtained from a pressure transducer which detects a pressure change within a fuel supply tube connected to each fuel injection valve so that the plasma ignition occurs near the end of the compression stroke of each cylinder.

8. A plasma ignition system for a multi-cylinder internal combustion engine as set forth in claim 1, wherein said plasma ignition energy generating circuit comprises:

(a) a DC-DC converter connected to the low DC voltage power supply for converting the DC voltage into an AC voltage and rectifying the AC voltage into a high DC voltage;

(b) a single capacitor connected to said DC-DC converter for charging the ignition energy from said DC-DC converter;

(c) a single switching element connected to said capacitor for passing the plasma ignition energy discharged from said capacitor into one of the plasma ignition plugs when turned on;

(d) a single diode connected to said capacitor for grounding one electrode of said capacitor while being charged with ignition energy from said DC-DC converter; and (e) an inductor connected to said capacitor and diode for producing a large oscillation together with said capacitor, said oscillation device comprises:

(f) a multiple spark control circuit for generating and outputting an oscillation drive signal in response to a multiple spark start signal having a fixed phase difference with respect to the plasma ignition timing signal;

(g) a multiple spark self-oscillation circuit connected to said multiple spark control circuit for generating the high-frequency oscillation voltage whenever the oscillation drive signal is inputted from said multiple spark control circuit;

and said controlling and actuating means comprises:

(h) a delay trigger signal generator responsive to the plasma ignition timing signal according to the engine revolutional speed for generating and outputting a delay trigger signal into said switching element and for outputting an oscillation halt signal into said DC-DC converter at the substantially same time in response to the plasma ignition timing signal to halt the oscillation of said DC-DC converter; and (i) a distributor having a rotor connected to said self-oscillation circuit which rotates with the engine crankshaft and a plurality of fixed contacts each connected to one of the plasma ignition plugs for selectively distributing the high-frequency oscillation voltage from said multiple spark self-oscillation circuit into one of the plasma ignition plugs to perform the plasma ignition when said rotor comes in contact with said corresponding fixed contact, whereby the plasma ignition plug at which the multiple sparking is generated securely performs a plasma ignition without misfire using the plasma ignition energy from said capacitor since the resistance between the electrodes of the plasma ignition plug is reduced by previous multiple sparking.

9. A plasma ignition system for a multi-cylinder internal combustion engine as set forth in claim 8, wherein said multiple spark self-oscillation circuit comprises a transformer having a primary first coil, the ends thereof being connected across a capacitor to form an LC oscillation circuit, connected to the output terminal of said multiple spark control circuit, a secondary coil, one end of which is connected to said rotor for outputting a high-frequency oscillation voltage, and a feedback coil for feeding back the high-frequency oscillation voltage, and a primary second coil, each end of which is connected to the collector of a transistor and the intermediate tap of which is connected to a capacitor and the DC voltage power supply in parallel for generating and further outputting an oscillation voltage to apply across said secondary coil when both transistors are turned on and off alternatingly by the feedback signal from said feedback coil.

10. A plasma ignition system for a multi-cylinder internal combustion engine as set forth in claim 8, wherein the plasma ignition signal to be inputted into said delay trigger signal generator is obtained from the pressure transducer which detects a pressure change within the fuel supply tube connected to each fuel injection valve and multiple sparking start signal to be inputted into said multiple sparking circuit is obtained from the engine crankshaft rotations according to the number of cylinders.

11. A plasma ignition system for a multi-cylinder internal combustion engine as set forth in claim 10, wherein the plasma ignition timing signal is obtained from the multiple sparking start signal with a predetermined phase delay.

12. A plasma ignition system as set forth in claim 1, wherein said plasma ignition energy generating circuit comprises:

(a) a voltage booster which operatively boosts a low DC voltage to the predetermined high DC voltage;

(b) a plurality of the capacitors, each provided for the corresponding engine cylinder for charging to the predetermined high DC voltage so as to supply the charged plasma ignition energy into the corresponding plasma ignition plug;

(c) a plurality of the inductors, each provided for the corresponding engine cylinder for generating a damped oscillation so as to generate the plasma ignition at the corresponding plasma ignition plug together with said corresponding capacitor when said corresponding capacitor discharges the plasma ignition energy;

and said controlling and actuating means comprises:

(a) an ignition timing detector which detects the ignition timing of each engine cylinder in accordance with the engine speed and outputs an ignition timing signal whenever the engine revolves through a predetermined angle;

(b) an ignition timing signal distributing means which receives the ignition timing signal and distributes a pulse signal at a plurality of output terminals thereof whose number corresponds to the number of engine cylinders whenever the ignition timing signal is received from said ignition timing detector;

(c) a first group of trigger signal generators, each trigger signal generator of said first group receiving the pulse signal from said ignition timing signal distributing means and outputting a first trigger signal for discharging said corresponding capacitor; and (d) a plurality of switching elements, each provided for the corresponding capacitor and which turns on to discharge the plasma ignition energy within said capacitor into the corresponding plasma ignition plug in response to the trigger signal from said corresponding trigger signal generator of the first group.

13. A plasma ignition system as set forth in claim 12, wherein said oscillation device comprises a second group of trigger signal generators, each trigger signal generator connected to one of the trigger signal generators of said first group for outputting a second trigger signal to continue the application of the oscillation voltage to the corresponding plasma ignition plug installed within the cylinder which is in substantially the start of compression stroke until at least the corresponding plasma ignition plug generates the plasma ignition.

14. A plasma ignition system as set forth in claim 1, wherein said controlling and actuating means comprises a distributor having a rotor connected to said oscillation device and a plurality of fixed contacts, each connected to the corresponding plasma ignition plug and each plasma ignition plug connected to said inductor of said plasma ignition energy generating circuit and wherein said oscillation device comprises:

(a) a multiple spark control circuit for generating and outputting an oscillation drive signal in response to a multiple spark start signal having a fixed phase advance with respect to a plasma ignition timing signal which is generated at the predetermined ignition timing of each engine cylinder; and (b) a multiple spark self-oscillation circuit connected to said multiple spark control circuit for generating and applying the high-frequency oscillation voltage to one of the plasma ignition plugs via said distributor so that the oscillation voltage is applied to the plasma ignition plug within the cylinder which is in substantially the start of compression stroke in response to the oscillation drive signal from said multiple spark control circuit.

* * * * *